May 30, 1939.  J. CANETTA  2,160,209
FLUID PRESSURE BRAKE
Filed April 24, 1937  3 Sheets-Sheet 1
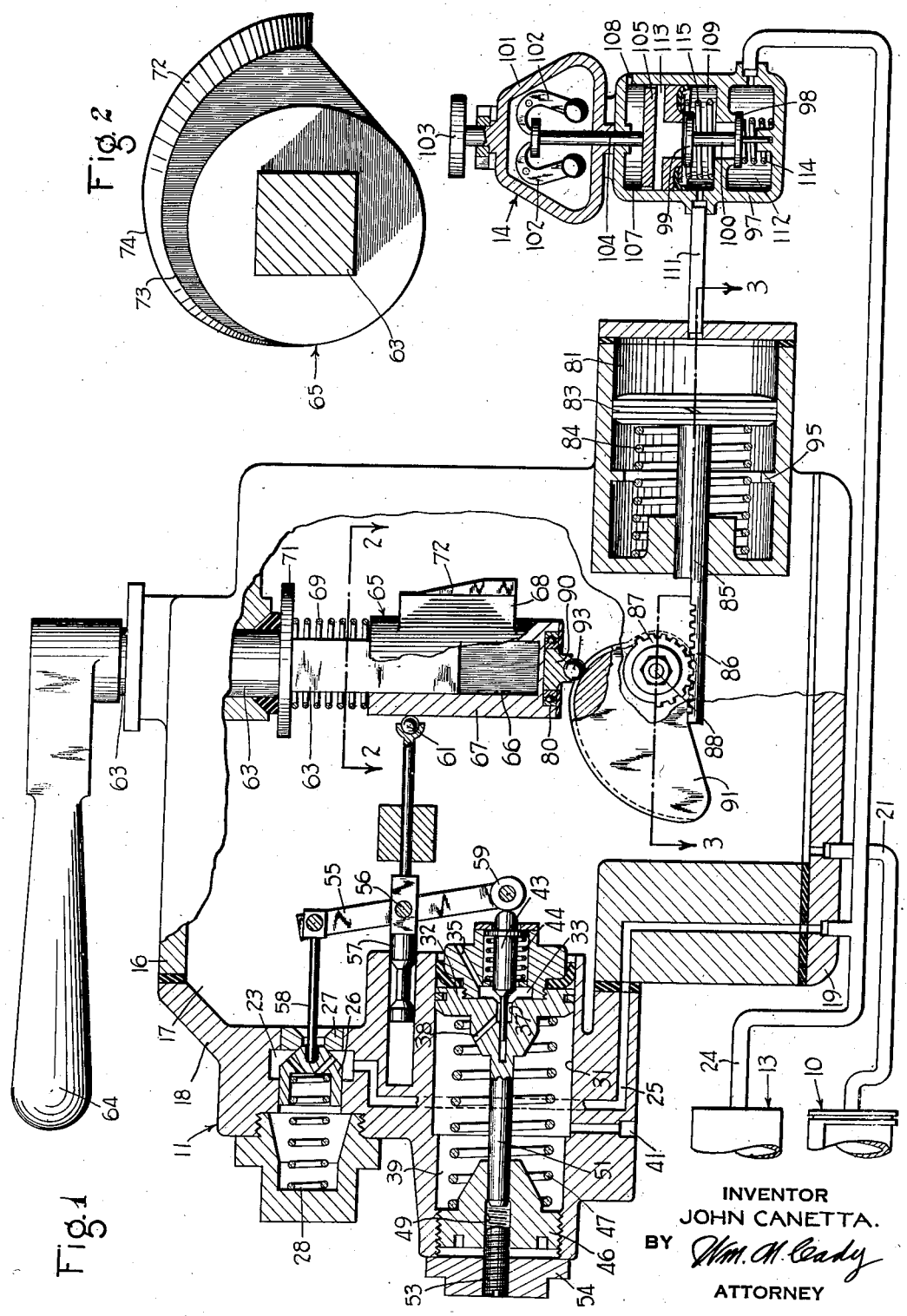
INVENTOR
JOHN CANETTA.
BY Wm. M. Cady
ATTORNEY May 30, 1939.                    J. CANETTA                    2,160,209
                             FLUID PRESSURE BRAKE
                    Filed April 24, 1937            3 Sheets-Sheet 2

INVENTOR
JOHN CANETTA.
BY *Wm. M. Cady*
ATTORNEY

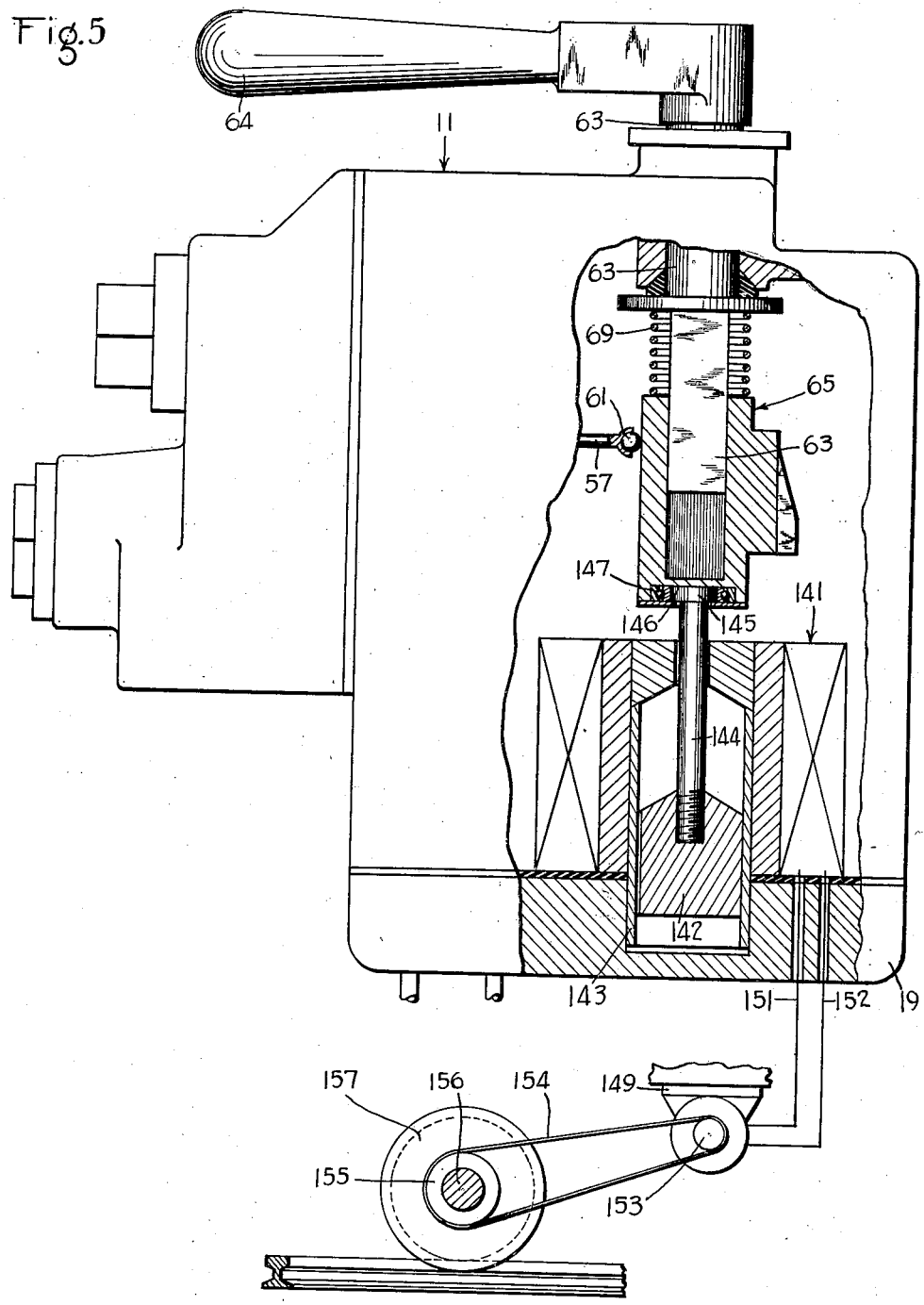

Patented May 30, 1939

2,160,209

UNITED STATES PATENT OFFICE 2,160,209

FLUID PRESSURE BRAKE

John Canetta, Wilkinsburg, Pa., assignor to The Westinghouse Air Brake Company, Wilmerding, Pa., a corporation of Pennsylvania Application April 24, 1937, Serial No. 138,740

27 Claims. (Cl. 303—21)

This invention relates to fluid pressure brakes, particularly fluid pressure brake equipment in which the degree of application of the brakes as effected manually under the control of an operator is limited to different degrees according to variations in an operating condition of the vehicle, such as the speed of the vehicle.

In the Patent 2,042,112 of Ewing K. Lynn and Rankin J. Bush, there is disclosed and claimed a self-lapping valve device in which a supply valve and a release valve are operatively controlled, through a floating lever carried on an actuating rod which is shifted by a cam element fixed on a rotary shaft, to establish a brake cylinder pressure in correspondence to the angle of rotary movement of the rotary shaft from a normal brake release position.

It is an object of my invention to provide an improvement over the construction shown in the patent to enable the pressure attained in the brake cylinder for rotation of the rotary operating shaft through a given angle to be varied.

Another object of my invention is to provide a self-lapping brake valve device, of the type shown in the Patent 2,042,112, in which the degree of brake cylinder pressure, attained by rotation of the rotary operating shaft through a given angle, may be varied dependent upon a variable operating condition of the vehicle, such as the speed of the vehicle or the load carried on the vehicle.

Another object of my invention is to provide a fluid pressure brake equipment including a self-lapping brake valve device of the type shown in Patent 2,042,112, in which the maximum brake cylinder pressure attainable under the control of the operator is limited according to variations in a variable operating condition of the vehicle such as the speed of the vehicle or load carried on the vehicle.

Another object of my invention is to provide a self-lapping brake valve device of the type shown in Patent 2,042,112 and comprising a conoidal cam element shiftable on the rotary operating shaft of the brake valve device for causing different degrees of brake cylinder pressure to be established at different times for rotation of the operating shaft through a given angle.

The above objects, and other objects of my invention which will be made apparent hereinafter, are attained by means of several illustrative embodiments of my invention subsequently to be described and shown in the accompanying drawings, wherein, Fig. 1 is a simplified diagrammatic view, with parts thereof in section, showing one embodiment of my invention, Fig. 2 is a sectional view, taken on line 2—2 of Fig. 1, and showing in further detail the construction of the conoidal cam element shown in Fig. 1, Fig. 3 is a fragmentary sectional view, taken on the line 3—3 of Fig. 1, showing in further detail the mechanism for adjusting the position of the conoidal cam element, Fig. 4 is a simplified fragmentary diagrammatic view, illustrating one method of remote control of the self-lapping brake valve device, and Fig. 5 is a fragmentary view, illustrating another embodiment of my invention.

*Description of embodiment shown in Fig. 1*

Figure 3:
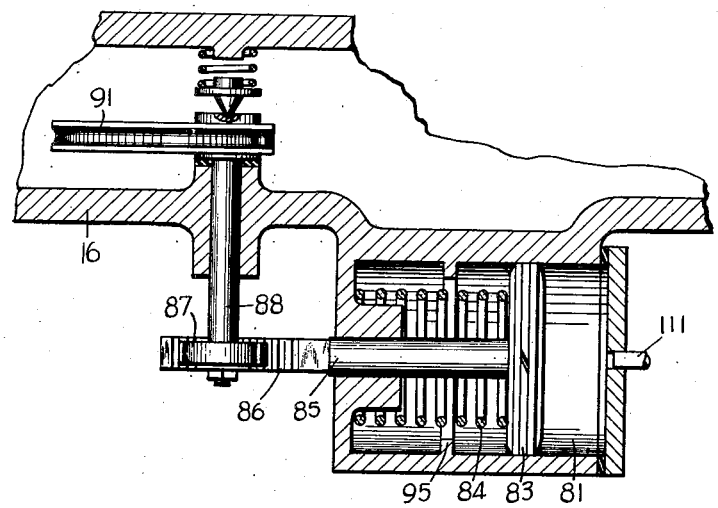

The embodiment shown in Fig. 1 comprises at least one brake cylinder 10, a self-lapping brake valve device 11 operative to cause fluid under pressure to be supplied from a main reservoir 13 to the brake cylinder 10 and to release fluid under pressure from the brake cylinder, and a speed-controlled valve device 14 for effecting the operation of the brake valve device 11.

The self-lapping brake valve device 11 comprises a sectional casing including a main section 16 having a chamber 17 formed therein, which chamber is closed at the side of a valve casing section 18 suitably attached in sealed relation to the main casing section 16 and which is closed at the bottom by a pipe bracket casing section 19 also suitably attached in sealed relation to the main casing section 16. The chamber 17, hereinafter called the pressure chamber, is shown as constantly connected by a pipe 21 to the brake cylinder 10 but it should be understood that one or more relay devices may be provided between the pressure chamber and the brake cylinder if desired.

Formed in the valve casing section 18 is a chamber 23 which is constantly charged with fluid under pressure, as from the main reservoir 13, through a pipe 24, hereinafter called the main reservoir pipe, and a branch pipe and passage 25. A supply valve 26, in the form of a ported valve piston is normally yieldingly urged by a spring 28 into seated relation on an associated valve seat 27 fixed to the casing section 18, to cut off communication between the chamber 23 and the pressure chamber 17.

Also formed in the valve casing section 18 is a bore 31 containing a piston 32 having a chamber 33 therein. The chamber 33 is constantly connected to the pressure chamber 17 through a port or passage 35 in the piston and also to atmosphere through an axial bore 37 in the piston and a port 38 open to a chamber 39 at the side of the piston 32 opposite to the pressure chamber 17, which chamber 39 is constantly open to atmosphere through an exhaust port or passage 41.

A pin type valve 43, hereinafter called the release valve, is contained in the chamber 33 and is normally yieldingly biased to an unseated position by a spring 44 to establish communication from the pressure chamber 35 to atmosphere by way of passage 35, chamber 33, bore 37, passage 38, chamber 39 and exhaust port 41.

Interposed in the chamber 39 between the piston 32 and a threaded plug 46 screwed into the outer end of the bore 31 is a coil spring 47 which urges and normally positions the piston 32 inwardly of the bore 31 and yieldingly opposes movement of the piston outwardly of the bore 31. In the threaded plug 46 is an axial bore 49 which has a smooth inner portion and a threaded outer portion. The smooth inner portion of the bore slidably receives the end of a stem 51 of the piston 32 and the outer threaded portion of the bore 49 receives a set screw 53 which is engaged by the outer end of the stem 51 of the piston 32 and serves as a stop to limit the movement of the piston 32 outwardly of the bore 31. A lock nut 54 may be provided on the set screw 53 to prevent undesired loosening thereof.

Operation of the supply valve 26 and of the release valve 43 is effected by means of a so-called "floating" lever 55 which is pivotally mounted intermediate its ends, as by a pin 56, on an actuating rod or stem 57 which is slidably mounted in the casing. One end of the lever 55 has pivotally attached thereto a rod or stem 58 which extends to and engages in a recess in the face of the supply valve 26 at the inner seated area thereof. At the opposite end of the lever 55 is mounted a roller 59 which engages the inner end of the release valve 43.

When the rod 57 is shifted in the left-hand direction from the position shown, lever 55 is correspondingly pivoted about its upper end, which is held against movement by the spring 28 acting to hold the supply valve 26 seated, the lower end of the lever 55 being shifted in the left-hand direction to cause seating of the release valve 43 against the resisting force of spring 44. After the seating of the release valve 43, a further shift of the rod 57 in the left-hand direction causes the lever 55 to pivot about its lower end, which is held against movement by the resistance of spring 47, the upper end of lever 55 being shifted in the left-hand direction to effect unseating of supply valve 26 against the force of its biasing spring 28. Fluid under pressure is accordingly supplied from the main reservoir 13 to the pressure chamber 17 and brake cylinder 10.

As the pressure in chamber 17 increases, the force exerted thereby on piston 32 increases so as to compress the spring 47 and thus shift the piston outwardly of the bore 31. Lever 55 is thus rocked about the pin 56 in a clockwise direction by the force of spring 28 which maintains the release valve 43 seated while reseating the supply valve 26. When the supply valve 26 reseats, further increase in the pressure in chamber 17 stops and thus the movement of piston 32 outwardly of bore 31 is also immediately stopped.

Both the supply valve 26 and the release valve 43 are thus maintained in seated or closed positions and the attained pressure is thus maintained in chamber 17 and brake cylinder 10.

If the rod 57 is again shifted in the left-hand direction, the valves 26 and 43 are again operated, as before described, to further increase the pressure in the chamber 17, the attained pressure being in proportion to the degree of shift of rod 57 in the left-hand direction from its normal position.

If the rod 57 is shifted a sufficient extent in the left-hand direction from its normal position, the force of the pressure in chamber 17 acting on piston 32 will shift the piston 32 outwardly of bore 31 until the end of stem 51 of the piston strikes the set screw 53. The spring 28 will thus be prevented from reseating the supply valve 26 and fluid under pressure will be supplied past the valve 26 until the pressure in chamber 17 equals the pressure in main reservoir 13, which is obviously the maximum fluid pressure attainable in brake cylinder 10.

When the force holding rod 57 out of its normal position is partially relieved, the spring 44 unseats the release valve 43 and incidentally shifts the lower end of lever 55 in the right-hand direction to correspondingly return the rod 57 in the right-hand direction until stopped by the force holding rod 57 out of its release position. When release valve 43 unseats, fluid under pressure is released to atmosphere from pressure chamber 17 by way of passage 35 in piston 32, chamber 33, bore 37, port 38, chamber 39 and exhaust port 41. As the pressure in the pressure chamber 17 reduces, the spring 47 shifts the piston 32 inwardly of the bore 31 and reseats the release valve 43, thereby causing cessation of reduction of the pressure in chamber 17. Supply valve 26 is, accordingly, not unseated and thus the pressure in the chamber is reduced to a pressure corresponding to the degree of displacement of rod 57 from its normal position.

If the force holding the rod 57 displaced out of its normal position is further relieved, the release valve 43 is again unseated to reduce the pressure in chamber 17 and then subsequently reseated, as before, to cut off further reduction in pressure in chamber 17 when the pressure in chamber 17 corresponds to the extent of displacement of rod 57 from its normal position.

If the force holding rod 57 out of its normal position is entirely relieved, then the rod 57 will be returned to its normal position, wherein spring 47 is ineffective to cause reseating of the release valve 43. The pressure in chamber 17 and brake cylinder 10 will accordingly be reduced to atmospheric pressure thereby effecting release of the brakes.

The inner end of the actuating rod 57 is formed to receive and hold a relatively small ball-bearing 61 for minimizing the friction at the point of contact with an operating conoidal cam element 65 in the manner to be hereinafter described.

The actuating rod 57 is shifted to effect operation of the supply valve 26 and release valve 43 by rotary movement of an operating shaft 63 which is suitably journaled in the main casing section 16 and which may be rotatably moved in any desired manner, as by means of an operating handle 64 secured or fixed to a portion of the shaft at the exterior of the casing. The inner end of the shaft 63 within the casing is squared and the conoidal cam element 65 has a recess 66 of corresponding cross-section to slidably receive the end of the shaft, whereby the shaft and cam element are interlocked and rotate together.

As will be seen in Figs. 1 and 2, the conoidal cam element 65 has a cylindrical body portion 67 and, integral with or attached to the cylindrical portion a laterally extending cam portion 68. The squared recess 66 is co-axial to the longitudinal axis of the cylindrical body portion 67 and is of such a depth as to permit a substantial degree of movement of the cam element 65 slidably on the squared end of the shaft 63. A coil spring 69 interposed between a shoulder on the shaft 63 and the upper face of the cam element 65 yieldingly opposes upward movement of the cam element 65 relative to the shaft from a certain predetermined lower position of the cam element. A washer 71 may be provided between the spring 69 and the shoulder on the shaft, if as shown, the spring is larger in diameter than the shaft at the shoulder.

As will be observed, the cam portion 68 of the cam element 65 has formed thereon a sloping cam surface 72 which connects an upper inner spiral line 73 and a lower outer spiral line 74. The sloping cam surface 72 will accordingly be seen to be in reality a succession of an infinite number of spiral line surfaces widening outwardly from the inner spiral line 73 to the outer spiral line 74, all of the spiral lines merging into a common vertical plane or line at the originating end of the spirals shown at the left-hand side of the cam element in Fig. 2. The reason for calling cam element 65 a conoidal cam element should accordingly be apparent.

The cam surface 72 may have any desired contour or eccentricity. However, a spiral contour adapted to shift the actuating rod 57 in the left-hand direction, as viewed in Fig. 1, a distance proportional to the degree of rotary movement of the shaft 63 from a normal position is preferred because the pressure in chamber 17 and brake cylinder 10 will thereby also be correspondingly varied. Furthermore, it will be apparent that the difference in the eccentricity between the upper inner spiral line 73 and the lower outer spiral line 74 may be selected for a given height or width of cam surface to impart any desired degree of slope to the cam surface 72.

With the operating handle 64 of the self-lapping brake valve device 11 in its normal or brake release position, the ball-bearing 61 at the inner end of the actuating rod 57, which as previously stated is small enough to effect a substantially single point of contact with the cam surface 72 on the conoidal cam element 65, engages the cam surface at the originating end thereof in the vertical plane or line common to all the spiral lines along the vertical axis of the cam surface. Accordingly, the actuating rod 57 is always returned to the same normal position upon the return of the operating handle 64 and shaft 63 to the normal position thereof.

If the ball-bearing 61 engages the cam surface 72 adjacent the upper spiral line 73, it will be seen that the actuating rod 57 will be shifted a certain distance in the left-hand direction for rotation of the rotary shaft 63 through a given angle. If now, the conoidal cam element 65 is raised so that the ball-bearing 61 engages the cam surface 72 adjacent the lower spiral line 74, then rotation of the rotary shaft 63 through the given angle will effect a greater displacement of the rod 57 in the left-hand direction. If the conoidal cam element 65 is positioned so that the ball-bearing 61 on the rod 57 engages the cam surface 72 on a spiral line between the spiral lines 73 and 74, it will be seen that rotation of the rotary shaft 63 through the given angle will cause displacement of the actuating rod 57 in the left-hand direction to a greater extent than when the ball-bearing engages the cam surface adjacent the spiral line 73 and to a lesser extent than when it engages the cam surface adjacent the spiral line 74. It should, accordingly, be apparent that the displacement of the actuating rod 57 in the left-hand direction, for rotation of the shaft 63 through a given angle, increases progressively as the cam element 65 is raised and decreases progressively as the cam element is lowered.

The position of the cam element 65 vertically on the shaft 63 may be adjusted in any desired or suitable manner, for example, according to variations in a variable operating condition of a car or train, such as the speed of the train or the load on a car or car truck. For purposes of illustration, the position of the cam element 65 vertically on the shaft is shown as determined according to the pressure in a chamber 81 formed in casing section 16 of the brake valve device 11, as shown, or in a separate casing section attached to casing section 16, the pressure in the chamber 81 being determined substantially according to the speed of the vehicle or train by means of the speed-controlled valve device 14. As will be apparent in Figs. 1 and 3, the pressure of the fluid supplied to the chamber 81 shifts a piston 83 against the force of a resisting spring 84 to a position corresponding substantially to the pressure in the chamber 81. The piston 83 has a stem 85, suitably journaled in the casing and having at the exterior end thereof a gear rack 86 which meshes with a pinion gear 87 fixed on a shaft 88. Shaft 88 is suitably journaled in the casing section 16 and has fixed thereto a cam 91. The cam surface of the cam 91 is grooved, as shown in Fig. 3, to cooperatively engage a ball-bearing 93 carried at the bottom of the cylindrical body portion 67 of the cam element 65. The ball-bearing 93 may be held loosely in a fitting 90 which is suitably carried at the bottom of the cam element 65 and which is adapted as by a ball-bearing race 80, to rotate relative to the cam element.

The contour and eccentricity of the cam 91 is preferably such that as the cam 91 is rotated in a clockwise direction, as viewed in Fig. 1, the cam element 65 is raised against the resisting force of the spring 69. Furthermore, the eccentricity and the contour of the cam 91 is such that the cam element 65 is raised or lowered by rotation of the cam element 91, through the medium of the pinion gear 87, gear rack 86, and piston 83 to a position which corresponds substantially to the pressure in the chamber 81.

For, example, when the pressure in the chamber 81 is at atmospheric pressure, the spring 84 shifts the piston 83 to an extreme right-hand position as viewed in Fig. 1, thereby rotating the cam 91 in a counterclockwise direction to the position shown wherein the spring 69 adjusts the cam element 65 downwardly to its lowermost position such that the ball-bearing 61 at the end of the actuating rod 57 is adjacent the upper inner spiral line 73 of the cam surface 72 on the cam element 65. As the pressure in the chamber 81 increases, the piston 83 is shifted in the left-hand direction, against the resisting force of the spring 84, to cause the cam 91 to be rotated in a clockwise direction, thereby raising the conoidal cam element 65 to a position corresponding to the pressure established in the chamber 81. Clearly, as the cam element 65 is raised, the ball-bearing 61 on the end of the actuating rod 67 is progressively aligned in a horizontal plane with spiral lines of ever increasing eccentricity. When a maximum pressure is established in the chamber 81, the piston 83 engages a stop 95 and thus correspondingly positions the cam 91 to so adjust the cam element 65 that the ball-bearing 61 on the actuating rod 57 is substantially aligned with the lower spiral line 74 on the cam surface 72.

The pressure in the chamber 81 may be varied according to any variable operating condition of the vehicle or train of cars. For purposes of illustration, I have shown the pressure of the fluid in the chamber 81 as being controlled according to the speed of the vehicle or train through the medium of the speed-controlled valve device 14.

The speed-controlled valve device 14 comprises a casing having a stationary portion 97 embodying a self-lapping valve mechanism including a supply valve 98 and a release valve 99, and a rotary casing section 101 embodying a centrifuge device including weighted levers 102 pivoted intermediate the ends thereof to the casing 101 and rotatable therewith. The rotary casing section 101 is adapted to be rotated according to the speed of the vehicle, as by an endless belt drive from an axle, or other element driven according to the speed of the car or train, to a pulley 103 co-axially secured to the casing 101. As the speed of the vehicle increases, the outer weighted ends of the levers 102 move outwardly thus causing the inner ends of the levers to press on the upper end of a rod or stem 104 which extends into the stationary casing section 97 and is slidable with respect thereto.

Contained in the stationary casing 97 is a movable abutment, in the form of a piston 105, adapted to be engaged by the lower end of the slidable stem 104. At one side of the piston 105 is a chamber 107 which is constantly open to atmosphere through a port 108. At the opposite side of the piston 105 is a chamber 109 which is constantly connected to the chamber 81 as by a pipe 111. Also formed in the stationary casing 97 is a chamber 112 which is constantly connected to and charged with fluid under pressure from the main reservoir 13 through the main reservoir pipe 24. The piston 105 is provided with a passage 113 and suitable ports opening to opposite sides of the piston whereby to establish communication between the chambers 109 and 107.

The supply valve 98 and the release valve 99 are of the disc type and are connected co-axially by a common stem 100. A spring 114 interposed between the supply valve 98 and the casing urges the supply valve and the release valve upwardly. A coil spring 115 contained in the chamber 109 and interposed between the casing and the piston 105 yieldingly resists downward movement of the piston 105.

Briefly, the operation of the speed-controlled valve device 14 is as follows. Assuming that the pressure in the chamber 81 and the connected chamber 109 of the speed control valve device 114 is at substantially atmospheric pressure and that the vehicle or train is started from a stopped position, as the speed of the train increases above a certain low speed, the weighted levers 102 move outwardly and thus exert an increasing force downwardly on the upper end of the stem 104 to cause the piston 105 to be shifted downwardly against the force of the spring 115. The piston 105, in moving downwardly first engages the release valve 99 and then shifts the release valve and the supply valve 98 downwardly together, the release valve 99 being maintained firmly seated against the piston 105 to close the connection between the chamber 109 and the exhaust chamber 107 through the passage 113 in piston 105 while the supply valve 98 is unseated to open communication between the chamber 112 and the chamber 109. Fluid under pressure is accordingly supplied from the main reservoir 13 to the chamber 81 through the main reservoir pipe 24, chamber 112, past the unseated supply valve 98, chamber 109, and pipe 111. As the pressure of the fluid supplied to the chamber 81 and effective in the chamber 109 acts on the lower face of the piston 105, the increasing upward force exerted thereby eventually increases sufficiently to counterbalance the force downwardly exerted by the stem 104. As a result, the spring 115 shifts the piston 105 upwardly sufficiently to permit reseating of the supply valve 98 by the spring 114. When the supply valve 98 is seated, the further supply of fluid under pressure to the chamber 81 is cut off and thus, there being no further increase in the pressure of the fluid in chamber 109, the piston 105 remains in such position that the release valve 99 still closes communication between the chamber 109 and exhaust chamber 107 through the passage 113 in the piston 105.

As the speed of the vehicle or train further increases, the weighted levers 102 are correspondingly shifted to an increasing extent outwardly, and the operation just described is repeated. When the vehicle or train travels at a maximum high speed, the pressure in the chamber 81 attains the pressure sufficient to counterbalance the maximum downwardly exerted force of weighted levers 102 on the stem 104. If the pressure in chamber 81 is insufficient to shift the piston 105 upwardly so as to effect reseating of supply valve 98, then the maximum pressure attained in the chamber is of course the pressure maintained in the main reservoir.

As the speed of the vehicle or train diminishes, the weighted levers 102 return inwardly toward the stem 104 and the force urging the stem 104 downwardly is thus diminished according to the reduction in the speed. Spring 115 thus becomes effective to shift the piston 105 upwardly away from the release valve 99, thus opening communication between the chamber 109 and the exhaust chamber 107 through the passage 113 of the piston 105 and thereby causing fluid under pressure to be released from the chamber 81 to atmosphere through exhaust port 108. When the pressure in the chamber 81 reduces sufficiently, the force exerted downwardly on the stem 104 by the weighted levers 102 again shifts the piston 105 downwardly to effect reseating of the release valve 99 to cut off further release of fluid under pressure from the chamber 81. It will be seen that further downward movement of the piston 105 is accordingly immediately stopped and that, consequently, unseating of the supply valve 98 is not effected.

As the speed of the vehicle further reduces, the downward force exerted on stem 104 is again correspondingly reduced and the release valve 99 is thus unseated to further release fluid under pressure from the chamber 81 until the the pressure in the chamber is reduced to a degree corresponding to the reduction in the speed, at which time the release valve 99 is again reseated to close off the further release of fluid under pressure from the chamber 81.

When the vehicle is brought to a complete stop so that the weighted levers 109 exert no downward force on the stem 104, spring 115 shifts the piston 105 upwardly to effect unseating of the release valve 99 and thus to cause fluid under pressure to be completely vented from the chamber 81 so that the pressure therein is reduced to atmospheric pressure.

*Operation of embodiment shown in Fig. 1*

Assuming that the main reservoir 13 is charged with fluid under pressure in the usual manner from a fluid compressor, not shown, and that the car or train is stopped or traveling at a speed sufficiently low that the speed-controlled valve device 14 causes the pressure in the chamber 81 to be at atmospheric pressure, an application of the brakes may be effected by turning the operating handle 64 of the self-lapping valve device 11 from the normal release position into the application zone to effect the desired degree of application. With the pressure in the chamber 81 at atmospheric pressure, the conoidal cam element 65 is in its lowermost position as shown in Fig. 1 and, consequently, the ball-bearing 61 at the inner end of the actuating rod 57 contacts the cam surface 72 adjacent the upper inner spiral line 73 of the cam surface. Accordingly, fluid under pressure is supplied from the main reservoir 13 to the pressure chamber 17 and to the brake cylinder 10, the pressure attained corresponding to the degree of movement of the operating handle from its normal release position.

If it is desired to increase the degree of the brake application, the operator shifts the operating handle 64 of the self-lapping brake valve device 11 to a further extent away from the normal position thereof, fluid under pressure being thus further supplied from the main reservoir 13 to the brake cylinder, in the manner previously described, until the pressure in the pressure chamber 17 and brake cylinder 10 corresponds to the position of the operating handle relative to its normal position.

When the operating handle is rotated to a maximum extent, such as through an angle of ninety degrees or one hundred and eighty degrees from the normal position thereof, as determined by a stop, not shown, the pressure established in the brake cylinder 10 is increased to a corresponding value. If the eccentricity of the cam surface 72 at the upper spiral line 73 thereof is sufficient, for the maximum degree of operative movement of the operating handle 64 from its normal position, to cause the supply valve 26 to be held unseated, in the manner previously described, then the pressure established in the brake cylinder will correspond to the maximum pressure in the main reservoir 13. However, the eccentricity of the cam surface 72 at or adjacent to the spiral line 73 may be ineffective to shift the actuating rod 57 sufficiently in the left-hand direction to prevent the reseating of the supply valve 26 for the maximum degree of operative movement of the handle 64, so that when the pressure in the brake cylinder 10 is built up to a certain value corresponding to the position of the handle 64, the supply valve 26 will reseat to cut off the further supply of fluid under pressure to the brake cylinder and thus establish a maximum pressure therein which is less than the pressure in the main reservoir 13.

In order to release the brakes, the operator returns the operating handle 64 back toward release position a certain degree depending upon the degree of reduction in the brake application desired. Therefore, the self-lapping brake valve device 11 is operated in the manner previously described to release fluid under pressure from the brake cylinder 10 past the unseated release valve 43 until such time as the pressure in the brake cylinder 10 and in the pressure chamber 17 is reduced sufficiently that the spring 47 shifts the piston 32 to reseat the release valve 43 and cut off the further release of fluid under pressure from the brake cylinder.

In order to further reduce the degree of brake application, the operator again returns the handle 64 toward the normal position, and thus further reduces brake cylinder pressure to a degree corresponding to the difference in the positions of the handle.

In order to completely release the brakes, the operator returns the handle 64 to its release position, whereupon the self-lapping valve device 11 operates, in the manner previously described, to completely release fluid under pressure from the brake cylinder.

Let it now be assumed that, with the main reservoir 13 charged with fluid under pressure, the car or train is traveling at a maximum high speed so that the speed-controlled valve device 14 causes the chamber 81 to be charged to a maximum degree of pressure. With the maximum pressure in the chamber 81, the piston 83 is shifted in the left-hand direction until it engages the stop 95 and the conoidal cam element 65 is accordingly raised to the highest position thereof wherein the ball-bearing 61 at the inner end of the actuating rod 57 engages the cam surface 72 substantially in alignment with the lower spiral line 74 on the cam surface. If an application of the brakes is now effected, by turning the operating handle 64 through a given angle from its normal position, it will be seen that the greater eccentricity of the spiral line 74, as compared to that of the spiral line 73, causes the actuating rod 57 to be shifted a fixed distance further in the left-hand direction, as compared to the distance it would be shifted for the same angle of rotation of the operating handle 74 with the conoidal cam element 65 in its lowermost position. As a result, the pressure established in the brake cylinder 10 is a correspondingly higher pressure, although the degree of angular movement of the operating handle 64 from its normal release position is the same for the two positions of the conoidal cam element 65.

As in the previous case, an increase in brake cylinder pressure may be effected by shifting the operating handle 64 a further extent from the normal position thereof. It should be clear, however, that the brake cylinder pressure established in this case will be proportionately greater according to the difference in the eccentricity of the spiral lines 73 and 74 of the cam surface for any chosen position of the operating handle 64.

If the operating handle 64 is rotated to its maximum extent away from the normal release position, the maximum degree of eccentricity of the cam surface 72 along the spiral line 74 is sufficient that the supply valve 26 is prevented from reseating as the pressure builds up in the pressure chamber 17 and in the brake cylinder 10. Consequently, the maximum pressure established in the brake cylinder 10 with the conoidal cam element 65 in its uppermost position will be the equivalent of the pressure in the main reservoir 13 and maximum degree of application of the brakes will accordingly be effected.

Now let it be assumed that the operator has shifted the operating handle 74 of the brake valve device 11 to a certain position in the application zone to establish a certain brake cylinder pressure, while the car or train is traveling at the high speed in which the conoidal cam element 65 is in its uppermost position. As the speed of the car or train reduces due to the application of the brakes, the speed-controlled device 14 operates in the manner described to reduce the pressure in the chamber 81 according to the reduction in speed. Accordingly, the spring 84 shifts the piston 83 in the right hand direction as viewed in Fig. 1 so that the cam 91 is rotated in a counterclockwise direction and the conoidal cam element 65 is correspondingly lowered from its uppermost position. In view of the fact that the eccentricity of the cam surface 72 reduces, as the point of contact of the ball-bearing 61 carried by the actuating rod 67 shifts from the spiral line 74 toward the spiral line 73, it will be seen that the pressure on the actuating rod 57 is relieved, in exactly the same manner as if the operating handle 64 were rotated backwardly toward release position. Accordingly, the self-lapping valve device 11 operates to reduce the pressure in the brake cylinder 10 correspondingly to the reduction in speed.

It will, accordingly, be seen that as the speed of the car or train reduces, the conoidal cam element 65 is gradually lowered so that when the speed of the car or train reduces below a predetermined low speed at which the pressure in the chamber 81 is reduced to atmospheric pressure, the ball-bearing 61 at the end of the actuating rod 57 engages the cam surface 72 of the conoidal cam element 65 at a point substantially in alignment with the upper inner spiral line 73. Thus, without changing the position of the operating handle 64 from the position to which it was shifted to effect the application of the brakes, a reduction in the degree of brake cylinder pressure and, accordingly, in the application of the brakes is effected automatically correspondingly to the reduction in speed of the car or train, the minimum pressure to which the brake cylinder pressure is reduced being that corresponding to the position of the operating handle 64 with the conoidal cam element 65 in its lowermost position. It will be apparent that the lower limit of brake cylinder pressure as effected by the speed-controlled device 14 will depend upon and be controlled by the position of the operating handle 64, the lower limit being one pressure with the handle 64 in one application position and a lesser pressure with the handle 64 in a position closer to its normal release position.

Figure 4:
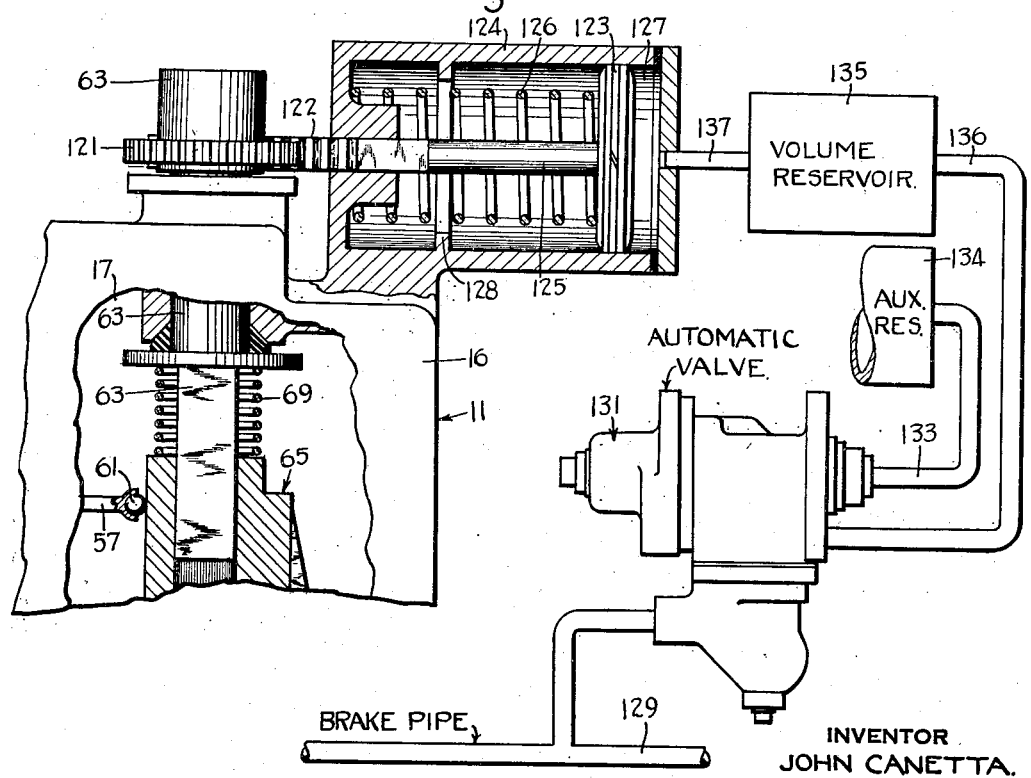

*Embodiment shown in Fig. 4*

Referring to Fig. 4, the embodiment shown therein illustrates a method of operating the self-lapping brake valve device 11 by remote control instead of by direct operation thereof by the operating handle 64. For simplicity, only those differences with respect to the embodiment shown in Fig. 1 will be described. In place of the operating handle 64, the operating shaft 63 has fixed to the external portion thereof a pinion gear 121 which meshes with a gear rack 122 adapted to be shifted by a fluid pressure responsive device, as for example a piston 123, which operates in a cylinder 124 attached to or formed on the casing section 16. The gear rack 122 may be formed on or attached to a stem 125 of the piston 123. The piston 123 is normally urged in the right-hand direction to a normal position by a spring 126 interposed between the piston and the end wall of the cylinder 124, in which position the rotary operating shaft 63 is correspondingly positioned in its normal or brake releasing position.

When fluid under pressure is supplied to a chamber 127 at the right of the piston 123, the piston 123 is shifted in the left-hand direction against the force of the spring 126 and rotation of the rotary operating shaft 63 is correspondingly effected, the degree of rotary movement of the operating shaft 63 from its normal position being in proportion to the pressure established in the chamber 127. When a maximum pressure is established in the chamber 127 the piston 123 is shifted sufficiently in the left-hand direction to engage a stop 128 which limits the maximum degree of rotary movement of the operating shaft 63 from its release position.

The pressure in the chamber 127 may be controlled from a remote point as for example a locomotive or control car removed from the car on which the self-lapping valve device 11 is mounted, by controlling pressure in a pipe 129, such as the usual brake pipe. As is well known, the brake pipe on a train of cars is normally charged to a certain pressure and a brake valve device located on the locomotive or control car may be operated to reduce or to increase the pressure in the brake pipe.

An automatic valve device 131, illustrated as a standard triple valve, may be provided and controlled in a well known manner by variations in the pressure in the brake pipe 129. Connected to the slide valve chamber of the automatic valve device 131, through a pipe 133, is an auxiliary reservoir 134. A volume reservoir 135 is connected to the usual brake cylinder port of the automatic valve device 131 by a pipe 136 and to the chamber 127, at the right of the piston 123, by a pipe 137.

In operation, the automatic valve device 131 is conditioned, when the brake pipe 129 is charged to the normal pressure thereof, to establish communication through which fluid under pressure is supplied from the brake pipe to the auxiliary reservoir 134 to charge it to the pressure in the brake pipe 129, and also to establish communication through which fluid under pressure is vented from the chamber 127 and volume reservoir 135 to atmosphere.

With the equipment conditioned as just described, the self-lapping valve device 11 is operated to effect an application of the brakes by causing the pressure in the brake pipe 129 to be reduced in the usual manner by a brake valve device not shown. The automatic valve device 131 operates in response to the reduction of pressure in the brake pipe 129 to cut off the exhaust communication from the chamber 127 and volume reservoir 135 to atmosphere and to establish a communication through which fluid under pressure is supplied from the auxiliary reservoir 134 to the volume reservoir and chamber 127, the pressure established in the volume reservoir and chamber 127 being in accordance with the degree of reduction in brake pipe pressure. The piston 123 is accordingly shifted by the pressure established in the chamber 127 to cause rotation of the operating shaft 63 of the self-lapping valve device 11, to effect a brake cylinder pressure corresponding to the degree of reduction in brake pipe pressure. It will be understood, of course, that the degree of brake cylinder pressure established for a given amount of reduction in brake pipe pressure will be different, depending upon the vertical position of the conoidal cam element 65 relative to the shaft 63, and the corresponding point of contact of the ball-bearing 61 at the end of the actuating rod 57 with the cam surface 72.

Embodiment shown in Fig. 5

In Fig. 5, another arrangement is disclosed for automatically adjusting the position of the conoidal cam element 65 according to a variable quantity, such as a variable operating condition of the vehicle. In this arrangement, electromotive means in the form of a solenoid coil 141, mounted in insulated relation on the pipe bracket casing section 19 of valve device 11 and disposed in coaxial relation to the longitudinal axis of the rotary operating shaft 63, shifts a plunger 142 to different positions along the axis of the solenoid coil varying with the degree of energization of the solenoid coil, the plunger 142 being slidable in a suitable bushing 143 surrounded by the solenoid coil. The plunger 142 is connected to the conoidal cam element, as by a stem or rod 144 which has a threaded connection at one end with the plunger 142, in the manner shown, and which is provided with an enlarged head portion at the opposite end thereof suitably secured within a recess 146 at the bottom of the cylindrical portion of the conoidal cam element 65. The plunger 142 may be guided in a fixed path and thereby held against rotation on its own axis, and therefore the rod 144 is rotatably affixed to the cam element 65, as by means of a ball-bearing race 147, in the manner shown, so that the cam element 65 may rotate on its own axis while the plunger 142 is held against rotation.

The solenoid coil 141 accordingly controls the position of the conoidal cam element 65 according to the degree of energization thereof because the cam element 65 is always positioned according to the position of the plunger 142. The degree of energization of the solenoid 141 may be controlled in any suitable manner, as for example according to a variable operating condition of the car or train. Any suitable means may be provided for supplying energizing current to the solenoid coil 141 according to the variations in the variable operating condition, as for example a generator 149 which may supply direct current to the solenoid coil 141 over a pair of wires 151 and 152.

If it is desired that the current supplied by the generator 149 be proportional to the speed of the car or train, the generator 149 may be provided with a pulley 153 on the armature shaft thereof which is driven, as by an endless belt 154, from another pulley 155 fixed to the axle 156 of a vehicle wheel 157, in the manner shown, or from any other element rotatable according to the speed of the vehicle.

The generator 149 may be so designed as to have a substantially straight-line voltage chararteristic, that is, it may be so designed that the output voltage of the generator increases directly in proportion to the rotational speed of the armature of the generator. Thus, it will be seen that if the armature of the generator is driven at a speed corresponding to the rotative speed of the vehicle wheel, the current energizing the solenoid coil 141 will be in proportion to the speed of the vehicle or train.

It should be understood that I contemplate variation of the output voltage of the generator 149 not only according to variations in the speed of the vehicle but also according to any other variable operating condition of the vehicle, such as the load carried by the car or car truck.

It is believed unnecessary to further describe the operation of the embodiment shown in Fig. 5, since it should be understood from the foregoing description of the operation of the embodiment shown in Fig. 1.

Summary

Summarizing, it will be seen that I have provided a fluid pressure brake equipment including an improved self-lapping brake valve device including a relatively simple device for causing the self-lapping brake valve device to establish different degrees of brake cylinder pressure, at different times, for a given operative movement of an operating member from its normal brake releasing position.

More specifically, the present invention comprises the provision of a self-lapping brake valve device of the type shown and claimed in Patent 2,042,112 and including a conoidal cam element the position of which may be shifted along the rotative axis of a rotary operating member to cause the establishment of different control pressures, at different times, for a given application position of the rotary operating shaft, depending upon the position of the conoidal cam element along the operating shaft.

It will also be seen that my invention includes broadly an equipment whereby the position of the conoidal cam element of the self-lapping brake valve device may be adjusted according to a variable operating condition of the vehicle, such as the speed of the vehicle or the load carried on a car or car truck. In the embodiment shown in Fig. 1, the adjustment of the conoidal cam element is effected mechanically and in the embodiment shown in Fig. 5 the adjustment of the cam element is effected electrically.

While I have shown my invention as embodied in several forms only, it will be apparent that various omissions, additions or modifications may be made in the embodiments shown without departing from the spirit of my invention. It is accordingly not my intention to limit the scope of my invention except as it is necessitated by the scope of the prior art.

Having now described my invention, what I claim as new and desire to secure by Letters Patent, is:

1. A self-lapping brake valve device comprising, in combination, a casing having a chamber, a supply valve, a release valve, an operating element movable different degrees out of a normal position, and a rotary cam element rotarily movable in accordance with the movement of said operating element for effecting operation of said valves to establish in the said chamber a fluid pressure corresponding to the degree of movement of the operating element out of its normal position, said cam element being so constructed and arranged as to be shiftable axially to different positions and effective, in the different axial positions thereof, to cause operation of the said valves to establish corresponding different degrees of pressure in said chamber for operation of the said operating element a given degree out of its normal position.

2. A self-lapping brake valve device comprising, in combination, a casing having a chamber, a supply valve, a release valve, an operating element movable different degrees out of a normal position, and a rotary cam element rotarily movable in accordance with the movement of said operating element for effecting operation of said valves to establish in the said chamber a fluid pressure corresponding to the degree of movement of the operating element out of its normal position, said cam element being shiftable axially to different positions and being so constructed and arranged that, in one axial position thereof, it effects operation of said valves to establish a certain pressure in said chamber and, in another axial position thereof, it causes operation of said valves to establish a different pressure in the said chamber, for the same degree of operative movement of the operating element out of its normal position.

3. A self-lapping valve device comprising, in combination, a casing having a chamber, a supply valve, a release valve, a rotary operating element rotatable on its longitudinal axis, a rotary cam element rotarily movable according to the rotary movement of the said operating element and shiftable axially to different positions, said cam element being so constructed and arranged that, when in one axial position thereof, it causes operation of the said valves to establish a certain pressure in said chamber for a given degree of rotary movement of the said operating element and, when in a different axial position thereof, it causes operation of said valves to establish a different pressure in the said chamber for the said given degree of rotary movement of the operating element out of its normal position.

4. A self-lapping brake valve device comprising, in combination, a casing having a chamber, a supply valve, a release valve, an operating element movable different degrees out of a normal position, and a rotary cam element rotarily movable in accordance with the movement of said operating element for effecting operation of said valves to establish in the said chamber a fluid pressure corresponding to the degree of movement of the operating element out of its normal position, said cam element being so constructed and arranged as to be shiftable axially to different positions and effective in the different axial positions thereof to cause operation of the said valves to establish corresponding different degrees of pressure in said chamber for operation of the said operating element a given degree out of its normal position, and means for shifting the said cam element axially to different positions.

5. A self-lapping brake valve device comprising, in combination, a casing having a chamber, a supply valve, a release valve, an operating element movable different degrees out of a normal position, and a rotary cam element rotarily movable in accordance with the movement of said operating element for effecting operation of said valves to establish in the said chamber a fluid pressure corresponding to the degree of movement of the operating element out of its normal position, said cam element being so constructed and arranged as to be shiftable axially to different positions and in the different axial positions thereof to cause operation of the said valves to establish corresponding different degrees of pressure in said chamber for operation of the said operating element a given degree out of its normal position, and means operated according to a variable quantity for automatically shifting the said cam element axially.

6. A self-lapping brake valve device comprising, in combination, a casing having a chamber, a supply valve, a release valve, an operating element movable different degrees out of a normal position, and a rotary cam element rotarily movable in accordance with the movement of said operating element for effecting operation of said valves to establish in the said chamber a fluid pressure corresponding to the degree of movement of the operating element out of its normal position, said cam element being so constructed and arranged as to be shiftable axially to different positions and, in the different axial positions thereof, to cause operation of the said valves to establish corresponding different degrees of pressure in said chamber for operation of the said operating element a given degree out of its normal position, means providing a second chamber, and means controlled according to the pressure in the said chamber for positioning the said cam element in corresponding different axial positions.

7. A self-lapping brake valve device comprising, in combination, a casing having a chamber, a supply valve, a release valve, an operating element movable different degrees out of a normal position, a rotary cam element rotarily movable in accordance with the movement of said operating element for effecting operation of said valves to establish in the said chamber a fluid pressure corresponding to the degree of movement of the operating element out of its normal posiiton, said cam element being so constructed and arranged as to be shiftable axially to different positions and, in the different axial positions thereof, to cause operation of the said valves to establish corresponding different degrees of pressure in said chamber for operation of the said operating element a given degree out of its normal position, and electro-responsive means so constructed and arranged as to shift the said cam element axially to different positions according to the degree of energization of the electroresponsive means.

8. A vehicle brake equipment comprising, in combination, a brake cylinder, a self-lapping valve device including a supply valve and a release valve, an operating element, a rotary cam element rotatable according to the movement of the said operating element from a normal position to cause operation of the said supply and release valves to establish a pressure in the brake cylinder corresponding to the degree of operative movement of the operating element from its normal position, said cam element being shiftable to different axial positions without movement of the operating element and so constructed and arranged that in different axial positions it causes operation of the supply and the release valves to establish corresponding different pressures in the brake cylinder, for a given operative movement of the operating element out of its normal position, and means for shifting the said cam element axially.

9. A vehicle brake equipment comprising, in combination, a brake cylinder, a self-lapping valve device including a supply valve and a release valve, an operating element, a rotary cam element rotatable, according to the movement of the said operating element from a normal position, to cause operation of the said supply and release valves to establish a pressure in the brake cylinder corresponding to the degree of operative movement of the operating element from its normal position, said cam element being shiftable axially to different positions without movement of the operating element and so constructed and arranged that in the different axial positions thereof it causes operation of the supply and the release valves to establish corresponding different pressures in the brake cylinder, for a given operative movement of the operating element out of its normal position, and means controlled according to variations in a variable operating condition of the vehicle for corresponding axially shifting the said cam element.

10. A vehicle brake equipment comprising, in combination, a brake cylinder, a self-lapping valve device including a supply valve and a release valve, an operating element, a rotary cam element rotatable according to the movement of the said operating element from a normal position to cause operation of the said supply and release valves to establish a pressure in the brake cylinder corresponding to the degree of operative movement of the operating element from its normal position, said cam element being shiftable axially to different positions without movement of the operating element and so constructed and arranged that in the different axial positions thereof it causes operation of the supply and the release valves to establish corresponding different pressures in the brake cylinder, for a given operative movement of the operating element out of its normal position, means forming a chamber, which is chargeable with fluid at different pressures, and means controlled according to the pressure in the said chamber for correspondingly axially positioning the said cam element.

11. A vehicle brake equipment comprising, in combination, a brake cylinder, a self-lapping valve device including a supply valve and a release valve, an operating element, a rotary cam element rotatable according to the movement of the said operating element from a normal position to cause operation of the said supply and release valves to establish a pressure in the brake cylinder corresponding to the degree of operative movement of the operating element from its normal position, said cam element being shiftable axially to different positions without movement of the operating element and so constructed and arranged that in the different axial positions thereof it causes operation of the supply and the release valves to establish corresponding different pressures in the brake cylinder, for a given operative movement of the operating element out of its normal position, means forming a chamber chargeable with fluid at different pressures, means controlled according to the pressure in the said chamber for correspondingly axially positioning the said cam element, and means controlled according to a variable operating condition of the vehicle for controlling the pressure in the said chamber.

12. A vehicle brake equipment comprising, in combination, a brake cylinder, a self-lapping valve device including a supply valve and a release valve, an operating element, a rotary cam element rotatable according to the movement of the said operating element from a normal position to cause operation of the said supply and release valves to establish a pressure in the brake cylinder corresponding to the degree of operative movement of the operating element from its normal position, said cam element being shiftable axially to different positions without movement of the operating element and so constructed and arranged that in the different axial positions thereof it causes operation of the supply and the release valves to establish corresponding different pressures in the brake cylinder, for a given operative movement of the operating element out of its normal position, means forming a chamber chargeable with fluid at different pressures, means controlled according to the pressure in the said chamber for correspondingly axially positioning the said cam element, and means responsive to the speed of the vehicle for controlling the pressure in the said chamber.

13. A vehicle brake equipment comprising, in combination, a brake cylinder, a self-lapping valve device including a supply valve and a release valve, an operating element, a rotary cam element rotatable according to the movement of the said operating element from a normal position to cause operation of the said supply and release valves to establish a pressure in the brake cylinder corresponding to the degree of operative movement of the operating element from its normal position, said cam element being shiftable axially to different positions without movement of the operating element and so constructed and arranged that in the different axial positions thereof it causes operation of the supply and the release valves to establish corresponding different pressures in the brake cylinder, for a given operative movement of the operating element out of its normal position, and means including electroresponsive means for shifting the cam element axially to different positions according to the degree of energization of the electroresponsive means.

14. A vehicle brake equipment, comprising in combination, a brake cylinder, a self-lapping brake valve device including a supply valve, a release valve, an operating element movable different degrees out of a normal position, a rotary cam element rotarily moved according to the movement of said operating element out of its normal position for effecting operation of said valves to establish a pressure in the brake cylinder corresponding to the degree of movement of the operating element out of its normal position, said cam element being shiftable axially to different positions and so constructed and arranged that, in the different axial positions thereof, it causes such operation of the said valves for a given degree of movement of the operating element out of its normal position as to effect different corresponding pressures in the brake cylinder, electroresponsive means so constructed and arranged as to shift said cam element axially to different positions according to the degree of energization of the electroresponsive means, and means controlled according to a variable quantity for automatically controlling the degree of energization of the electroresponsive means.

15. A vehicle brake equipment comprising, in combination, a brake cylinder, a self-lapping valve device including a supply valve and a release valve, an operating element, a rotary cam element rotatable according to the movement of the said operating element from a normal position to cause operation of the said supply and release valves to establish a pressure in the brake cylinder corresponding to the degree of operative movement of the operating element from its normal position, said cam element being shiftable axially to different positions and so constructed and arranged that in the different axial positions thereof it causes operation of the supply and the release valves to establish corresponding different pressures in the brake cylinder for a given operative movement of the operating element out of its normal position, electroresponsive means for shifting the said cam element axially to different positions according to the degree of energization thereof, and means controlled according to variations in a variable operating condition of the vehicle for automatically controlling the degree of energization of the said electroresponsive means.

16. A vehicle brake equipment comprising, in combination, a brake cylinder, a self-lapping valve device including a supply valve and a release valve, an operating element, a rotary cam element rotatable according to the movement of the said operating element from a normal position to cause operation of the said supply and release valves to establish a pressure in the brake cylinder corresponding to the degree of operative movement of the operating element from its normal position, said cam element being shiftable axially to different positions without movement of the operating element and so constructed and arranged that in the different axial positions thereof it causes operation of the supply and the release valves to establish corresponding different pressures in the brake cylinder for a given operative movement of the operating element out of its normal position, electroresponsive means for shifting the said cam element axially to different positions according to the degree of energization thereof, a generator for supplying current to energize the said electroresponsive means, and means for causing the current supplied by said generator to the electroresponsive means to vary according to variations in a variable operating condition of the vehicle.

17. A vehicle brake equipment comprising, in combination, a brake cylinder, a self-lapping valve device including a supply valve and a release valve, an operating element, a rotary cam element rotatable according to the movement of the said operating element from a normal position to cause operation of the said supply and release valves to establish a pressure in the brake cylinder corresponding to the degree of operative movement of the operating element from its normal position, said cam element being shiftable axially to different positions without movement of the operating element and so constructed and arranged that in the different axial positions thereof it causes operation of the supply and the release valves to establish corresponding different pressures in the brake cylinder for a given operative movement of the operating element out of its normal position, electroresponsive means for shifting the said cam element axially to different positions according to the degree of energization thereof, a generator for supplying current to energize the said electroresponsive means, and means for causing the current supplied by said generator to the electroresponsive means to vary according to variations in the speed of the vehicle.

18. In a vehicle brake equipment, in combination, a brake cylinder, a self-lapping valve device including an operating element movable from a normal position to varying degrees in an application zone for establishing pressures in the brake cylinder corresponding to the degree of movement of the operating element from its normal position, means providing a chamber chargeable with fluid at different pressures, and means responsive to the pressure in said chamber for shifting the said operating element from its normal position to varying degrees according to the pressure in said chamber.

19. In a vehicle brake equipment, in combination, a brake cylinder, a pipe normally charged with fluid under pressure, a self-lapping valve device including an operating element movable from a normal position to varying degrees in an application zone for establishing pressures in the brake cylinder corresponding to the degree of movement of the operating element from its normal position, means providing a chamber chargeable with fluid at different pressures, means responsive to the pressure in said chamber for shifting the said operating element from its normal position to varying degrees according to the pressure in said chamber, and means controlled according to the degree of reduction from the normal pressure in the said pipe for correspondingly controlling the pressure in said chamber.

20. In a vehicle brake equipment, in combination, a brake cylinder, a pipe normally charged with fluid under pressure, a self-lapping valve device including an operating element movable from a normal position to varying degrees in an application zone for establishing pressures in the brake cylinder corresponding to the degree of movement of the operating element from its normal position, means providing a chamber chargeable with fluid at different pressures, means responsive to the pressure in said chamber for shifting the said operating element from its normal position to varying degrees according to the pressure in said chamber, and means operative upon reduction from the normal pressure in the said pipe to cause an increase in the pressure in said chamber corresponding to the reduction of pressure in said pipe.

21. A self-lapping brake valve device comprising a casing having a chamber, a supply valve, a release valve, an actuating element shiftable out of a normal position to a plurality of different positions for effecting operation of the said valves to establish a different fluid pressure in said chamber for each of the positions of said element, and a rotary cam element effective upon rotation out of a normal position to shift said element out of its normal position, said cam element being shiftable axially to different positions and so constructed and arranged that in the different axial positions thereof it effects corresponding different degrees of displacement of said actuating element out of its normal position for a given degree of rotary movement out of its normal position.

22. A self-lapping brake valve device comprising a casing having a chamber, a supply valve, a release valve, an actuating element shiftable out of a normal position to a plurality of different positions for effecting operation of said valves to establish a different fluid pressure in said chamber for each of the positions of said element, and a cam element rotarily movable out of a normal position to cause shifting of said actuating element out of its normal position to the different positions thereof and shiftable axially to different positions, said cam element having a cam face thereon effective in the different axial positions of the cam element to cause said actuating element to be shifted different degrees out of its normal position for a given degree of rotary movement of the cam element out of its normal position and effective in the normal rotary position of the cam element to cause the said actuating element to be returned to the same or normal position.

23. A vehicle brake system comprising means operative to control the degree of application and the release of the brakes, and an element arranged to be either rotarily or axially moved to control the operation of the brake control means to vary the degree of application of the brakes partly in accordance with the rotary position and partly in accordance with the axial position of said element.

24. A vehicle brake system comprising means operative to control the degree of application and the release of the brakes, and an element arranged to be rotarily and axially moved, said element being effective in a given axial position when shifted rotarily a certain degree out of a normal position thereof to cause operation of the brake control means to effect a certain degree of application of the brakes and effective in a different axial position when shifted rotarily said certain degree out of its normal position to cause operation of the brake control means to effect a degree of application of the brakes different from the said certain degree.

25. A vehicle brake system comprising means operative to control the degree of application and the release of the brakes, an element arranged to be rotarily and axially moved to control the operation of the brake control means, manually controlled means for effecting rotary movement of said element, and means controlled automatically in response to a variable operating condition of the vehicle for effecting axial movement of said element.

26. A vehicle brake system comprising means operative to control the degree of application and the release of the brakes, an element arranged to be either rotarily or axially moved to control the operation of the brake control means, manually controlled means for effecting rotary movement of said element, and electro-responsive means for controlling the axial position of said element.

27. A vehicle brake system comprising means operative to control the degree of application and the release of the brakes, a rotary cam element adapted to be shifted axially to different positions, said cam element being effective to control the operation of the brake control means to vary the degree of application of the brakes dependent upon both the rotary and the axial positions of said cam element, and means controlled by a variable operating condition of the vehicle for controlling the axial position of said cam element.

JOHN CANETTA.